(No Model.)

F. E. BELDEN.
BICYCLE TIRE.

No. 467,245. Patented Jan. 19, 1892.

WITNESSES
Wm. Musser
A. B. Jenkins

INVENTOR
Frank E. Belden.
by Simonds & Burdett
Attorneys

THE NORRIS PETERS CO., PHOTO-LITHO., WASHINGTON, D. C.

UNITED STATES PATENT OFFICE.

FRANK E. BELDEN, OF HARTFORD, CONNECTICUT.

BICYCLE-TIRE.

SPECIFICATION forming part of Letters Patent No. 467,245, dated January 19, 1892.

Application filed October 9, 1890. Serial No. 367,505. (No model.)

*To all whom it may concern:*

Be it known that I, FRANK E. BELDEN, of Hartford, in the county of Hartford and State of Connecticut, have invented certain new and useful Improvements in Bicycle-Tires, of which the following is a full, clear, and exact description, whereby any one skilled in the art can make and use the same.

My invention is particularly adapted for use on light vehicles of the class of velocipedes, and my object is more particularly to provide a tire for bicycles, tricycles, and the like pedal-operated machines that shall possess all of the advantages of a solid-rubber tire and at the same time have certain features of advantage that shall more effectually prevent obnoxious vibration than does a solid tire.

My invention consists in an improved tire formed, preferably, of india-rubber and having its inner portion in that cellular condition produced by making the inner part of sponge rubber; and it further consists in details of the several parts making up the device as a whole, as more particularly hereinafter described, and pointed out in the claims.

Figure 1:
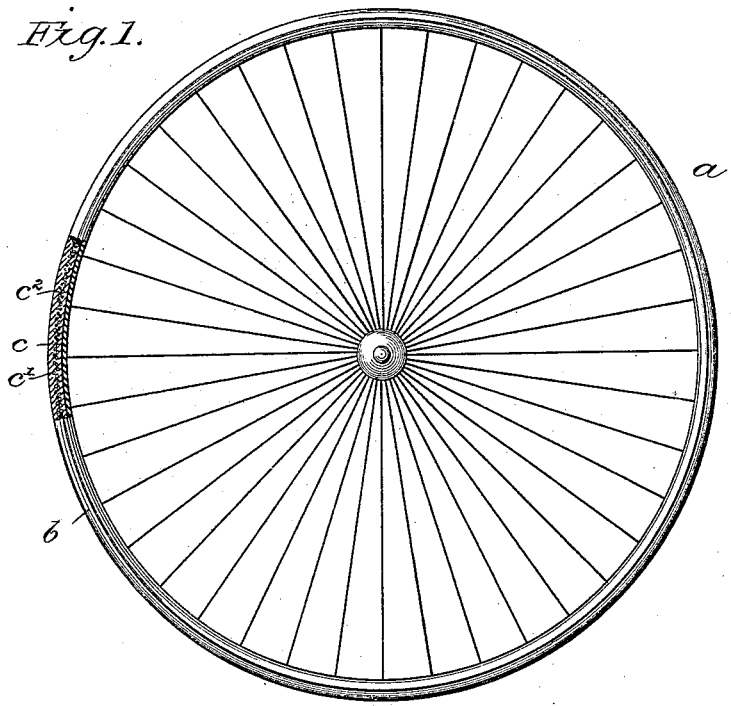
Figure 2:
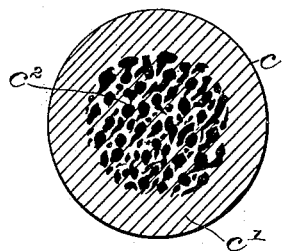
Figure 3:
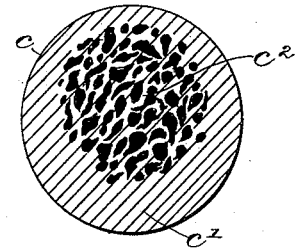

Referring to the drawings, Figure 1 is a detail side view of a bicycle-wheel, showing the tire in position, part of the rim of the wheel and part of the tire being cut in section. Fig. 2 is a detail view, on an enlarged scale in transverse section, of the tire, showing the inner portion formed in the center of the outer portion. Fig. 3 is a like view showing the inner portion formed eccentrically in the outer portion.

In the accompanying drawings the letter *a* denotes a wheel having a rim *b*, that is preferably recessed for the reception of a detachable tire *c*. This tire *c* is made, preferably, of india-rubber or like gum, and is secured to the rim by being sprung on it and then cemented or otherwise fastened in any ordinary or desirable manner that will enable the wheel to be put to its proper use without danger of loosening or throwing off the tire.

In the practice of my invention a suitable quantity of rubber with a foreign material, as alum or the like, mixed with it in the process of grinding is prepared and rolled into a sheet on the calender. Another quantity of rubber, mixed with the proper ingredients to render it solid when completed, is ground and rolled into sheets. The first sheet is rolled up into a roll of the desired size, and outside of this is then rolled the second sheet. All of this rubber being of the consistency known as "dough," the several layers, as the tubes are rolled up, adhere together and become practically one mass, which is then laid in a proper mold and subjected to heat. The effect of the heat is to thoroughly incorporate the mass, and in the process of vulcanizing, to which the crude tire is subjected, the rubber flows together and becomes practically one integral mass, the portion, however, that has been properly prepared to assume the sponge condition being by the heat caused to assume the cellular condition peculiar to what is known as "sponge rubber," the cells of various sizes and lengths permeating all parts of the mass of rubber that has been thus treated and producing the desired effect. I have found it better to cool the crude tire in the mold before opening it, as better results are obtained. The result of this process of manufacture is a tire of any desired outline as to cross-section, determined by the shape of the mold, having an outer or facing layer or portion $c'$ of solid rubber and an inner portion $c^2$ of sponge rubber.

The peculiarity of this tire is that its wearing or outer portion is of sufficient density and of the proper quality to give the best wear, while the cellular condition of the sponge rubber, forming a large part of the inner portion of the mass, is thoroughly permeated with cells, the walls between the cells, however, forming a good support to all parts of the mass without depriving the walls or outer portion of a certain degree of crosswise support either against a pulling or a crushing strain.

This improved tire is free from the fault of splitting through the walls that is common to a tire having a central hole or perforation of considerable size extending through it, by reason of the fact that while a large percentage of the mass in my improved tire is practically removed it is not so cut away as to leave the walls without transverse support at all parts. The peculiar cellular formation provides transverse walls that act as stays and lateral supports at all points across the tire.

I claim as my invention—

1. As an improved article of manufacture, a vehicle-tire made of rubber or like gum with the inner part of the tire in a spongy and cellular condition, all substantially as described.

2. As an improved article of manufacture, a vehicle-tire made of india-rubber or like gum, having a solid outer or wearing portion and an inner portion of sponge rubber intimately united with the outer portion, all substantially as described.

3. In combination, in a wheel, a rim having a tire-socket and a tire having an outer wearing portion and an inner portion made of sponge rubber, all substantially as described.

4. As an improved article of manufacture, a vehicle-tire made of india-rubber, having a solid outer portion and an integral inner portion in a spongy condition, all substantially as described.

FRANK E. BELDEN.

Witnesses:
A. B. JENKINS,
WM. MUSSER.